United States Patent [19]
Welker

[11] Patent Number: 5,924,673
[45] Date of Patent: Jul. 20, 1999

[54] METHOD AND APPARATUS FOR QUIETING TURBULENCE IN A GAS FLOW LINE VALVE

[75] Inventor: Robert H. Welker, Washington, Tex.

[73] Assignee: Welker Engineering Company, Sugar Land, Tex.

[21] Appl. No.: 09/035,559

[22] Filed: Mar. 5, 1998

Related U.S. Application Data

[62] Division of application No. 08/479,179, Jun. 7, 1995, Pat. No. 5,730,416.

[51] Int. Cl.⁶ .................................................. F16K 47/02
[52] U.S. Cl. ....................................... 251/118; 137/625.37
[58] Field of Search ...................... 251/118; 137/625.37, 137/625.3, 625.33; 138/40, 42

[56] References Cited

U.S. PATENT DOCUMENTS

| | | |
|---|---|---|
| 3,157,200 | 11/1964 | Rowan . |
| 3,170,483 | 2/1965 | Milroy . |
| 3,207,484 | 9/1965 | Rubin . |
| 3,250,342 | 5/1966 | Petry . |
| 3,271,845 | 9/1966 | Breber . |
| 3,591,129 | 7/1971 | Hulsey . |
| 3,602,261 | 8/1971 | Brown et al. . |
| 3,630,229 | 12/1971 | Nagel et al. . |
| 3,695,290 | 10/1972 | Evans . |
| 4,007,908 | 2/1977 | Smagghe et al. . |
| 4,085,774 | 4/1978 | Baumann . |
| 4,147,183 | 4/1979 | Kalsi . |
| 4,271,866 | 6/1981 | Bey . |
| 4,402,485 | 9/1983 | Fagerlund . |
| 4,611,786 | 9/1986 | Jorgensen et al. . |
| 4,614,440 | 9/1986 | King . |
| 4,758,098 | 7/1988 | Meyer . |
| 4,929,088 | 5/1990 | Smith . |
| 5,014,746 | 5/1991 | Heymann . |
| 5,054,521 | 10/1991 | Hendrick . |
| 5,070,909 | 12/1991 | Davenport . |
| 5,074,333 | 12/1991 | Martin . |
| 5,261,453 | 11/1993 | Hekkert et al. . |
| 5,307,830 | 5/1994 | Welker . |
| 5,664,760 | 9/1997 | Army, Jr. et al. ...................... 251/118 |

FOREIGN PATENT DOCUMENTS

2810118  9/1979  Germany .

Primary Examiner—Kevin Lee
Attorney, Agent, or Firm—Herzog, Crebs & McGhee; Bruce E. Bundick; Matthew A. Rosenberg

[57] ABSTRACT

A set of tubes, having inlets and outlets, is placed on the downstream side of a modulating flow regulator or valve, or plug, or other member in a gas flow line. The inlets collect all of the gas flow from the gas flow line into the tubes. The tubes bend gently and redirect the gas flow so that turbulence is significantly reduced in the tubes and the resulting flow is generally laminar. The tubes are grouped as a bundle downstream and positioned such that the tubes are generally parallel to each other in the proximity of the outlets so that downstream flow is significantly less noisy and turbulent, resulting in a generally laminar gas flow.

11 Claims, 5 Drawing Sheets

METHOD AND APPARATUS FOR QUIETING TURBULENCE IN A GAS FLOW LINE VALVE

This is divisional application of application Ser. No. 08/479,179, filed on Jun. 7, 1995, now U.S. Pat. No. 5,730,416 issued Mar. 24, 1998.

BACKGROUND OF THE DISCLOSURE

In a high pressure pipeline for delivering flowing gas products, substantial power is required by the pump stations. To raise the pressure and to deliver the flowing gas over a great distance, a substantial amount of energy is put into the flowing gas. Energy is wasted by dissipation resulting primarily from turbulence. For instance, if an irregular object is inserted into the pipeline, a very significant turbulence pattern is established. Indeed, the turbulence can create problems for the downstream an connections. As an example, if a high level in turbulence is created, the turbulence may create substantial vibrations to the immediate vicinity including the pipeline, the equipment causing the turbulence, and connected equipment such as a building or housing in the immediate vicinity. At a regulator, it is not uncommon for the turbulence to shake the building including all of the piping and connected gear. Where the piping is subject to serious shaking, related or auxiliary equipment and the housing or building are exposed to damage, perhaps extreme damage. In time, the equipment including the piping may be damaged (e.g., cracked or broken) by the vibration.

Considering the matter even further, the vibration creates noise which is often heard in the vicinity. Noise levels can become excessive. Again when this occurs, there is a very serious detrimental impact in the area. One aspect of that is that noise reducing devices have been devised. Assume as an example that a pipeline includes a valve in it. Assume further that the valve is located upstream of a straightener or other vane which is positioned in the pipeline to thereby reduce turbulence. In that instance, noise and vibration may exist in the region of the device causing the noise and will extend downstream. The spacing of these components in part defines a relatively noisy circumstance.

In one aspect of the present disclosure, the apparatus is constructed and arranged so that substantial downstream noise is reduced. In view of the fact that noise is created, the present invention reduces that noise by suppressing the noise at the noise source. There are many noise sources but the present disclosure is particularly intended for use with valves. More importantly, valves are relatively common and are the type of device practically always installed in a pipeline. Because they are commonplace, and because they form a lot of noise, and noise at extremely high or intense levels, it is desirable that the noise be suppressed. More importantly, it is desirable that the noise be suppressed in the device that makes the noise and in this instance, this refers to the valve.

In one advantageous aspect of the present disclosure, it is recognized that a valve creates substantial noise but the valve is, in accordance with the teachings of this disclosure, constructed so that noise and turbulence are significantly suppressed. The noise suppression mechanism includes a set of tubes which extend into the valve. Consider as one example the type of valve wherein the valve stem or operator is arranged at right angles with respect to the central axis of the pipeline. In a valve of this sort, there must be a redirection of the gas flow. This is often described as a single port, globe style valve having a protruding valve stem which operates with a downward push for closure. Such valves often are made with metal valve elements and metal seats. Alternately, the seats are formed of a sacrificial insert ring of composite material or softer metal. Generally, the valve of this type construction has advantages such as providing quick opening response, and relatively linear controllable percentage flow as a function of the measure of opening. In this particular instance, the flowing gas is directed against the bottom face of the valve element. It flows through the valve seat which surrounds the valve element. The flowing gas forces the valve element out of the way and continues on downstream in the pipeline. This can be an extremely noisy valve operation. It is especially noisy in light of the fact that there is a fairly large chamber above the valve element to enable the gas flow to travel upwardly parallel to the valve stem and then turn to flow outwardly or down the pipeline. Or, the flow may be from top to bottom of the valve element in a valve having the valve stem arranged for opening on upward movement.

The present disclosure sets forth a mechanism which overcomes this type of valve noise. In particular, it enables the suppression of valve created noise when the valve element is partially opened. Not only that, the device also has the advantage of leaving a clear area so that the valve element can still be serviced by removing the valve element on the mounting stem upwardly through a flange which is closed by a set of bolts located on a common flange circle. This particularly enables the chamber to be cleared so that the valve element can be removed through the chamber on the upstream or downstream side of the valve element. Noise is substantially suppressed and the noise intensities are dropped significantly by this invention.

In another aspect of the present disclosure, one type of valve construction is obtained with a teardrop plug or shaped insert which is positioned on the centerline of the valve structure and centrally or axially aligned with the pipe. The pipe connects at upstream- and downstream flanges. The flow is against the insert. The insert is flared with a slightly tapered leading face or edge. The insert is able to stop flow by cooperation with a sleeve which is moved by an external sleeve control mechanism. The sleeve is forced to move upstream or downstream, and closure is accomplished when the sleeve moves against the teardrop insert. The sleeve can move to intermediate positions so that controlled flow through the valve is achieved. The teardrop shaped insert is located downstream so that it can be supported on two or three relatively thin radial mounting vanes. These interrupt an annular flow space around the teardrop or streamlined insert. The present invention modifies such a control flow regulator by further incorporating a plurality of small tubes arranged around the insert and which are just downstream of the movable sleeve. The multiple tubes pick up the flow in the region where turbulence is initiated. This is immediately downstream of the trailing edge of the sleeve. This movable sleeve, functioning as a valve element, is moved to an open position thereby metering flow which would otherwise form intense noise during flow. The several tubes pick up the flow and prevent noise.

In another version of the present disclosure, there is a device known as the single or double port valve from Mooney Controls of Salt Lake City. That valve utilizes an inlet bend input, a similar output and a transverse membrane loaded by a spring. When pressure behind the diaphragm is reduced, as for example, removing fluid pressure in conjunction with the spring, the diaphragm is deflected and flow is permitted. The flow is forced to turn through a substantial angle. As it flows over the dam or partition and emerges on the downstream side, the flowing gases are highly turbulent. In the present apparatus, that difficulty has been overcome.

In another device, one which particularly provides for a removable structure as will be detailed, flow is directed into an elbow. At the elbow, the flow is forced to make a 90° bend. The elbow is constructed with an elbow positioned flange. The flange is located so that it can be removed to obtain access to the components of the device. When removed, the flange enables the components to be serviced, thereby enabling replacement of parts which might wear. On the downstream side, the elbow connects with a region which straightens the flow and delivers the flow in a set of tubes directed to form axial flow for the pipeline. As a practical matter, this device involves flow through a curving 90° turn, a sharp elbow bending 90° and restores the flow to the original direction. Turbulence arises on the downstream side. The turbulence is prevented by the incorporation of tubes forming a nest of tubes. The nest of tubes continues the flow further downstream.

Summarizing the present disclosure, it sets forth a downstream flow gathering set of cooperative tubes which reduces noise and turbulence thereby avoiding energy dissipation. It reduces vibration generated from a flowing gas and reduces significantly the pumping energy that is required to overcome such dissipated energy. In addition to that, it provides for a reduction in turbulence, noise and vibration coupled through the adjacent support structures, pump stations, valve support mechanisms and the like. Furthermore, it provides for a reduction in noise and turbulence from a valve or a flow regulator. A valve is defined as a structure having a closed valve element which moves against the valve seat and it moves to a spaced location from the valve seat to provide a controlled flow rate. A flow regulator is typically a device which changes the downstream pressure by placing a restriction of controlled size upstream.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope for the invention may admit to other equally, effective embodiments.

FIG. 1 is a partial sectional view through a valve which is supported on a stem which is positioned in a valve seat and which opens to permit flow, the axis of movement of the valve being perpendicular to the axis of the pipeline in which the valve is connected and further showing the incorporation of a set of small tubes which receives the downstream flow, thereby permitting a reduction in noise by reducing turbulence.

FIG. 2a is a detail showing a plurality of tubes deployed in a circle where FIG. 2a shows the tubes arranged in a straight line for description;

DETAILED DESCRIPTION OF THE PREFERRED EMBODIMENTS

Figures 1, 2A:
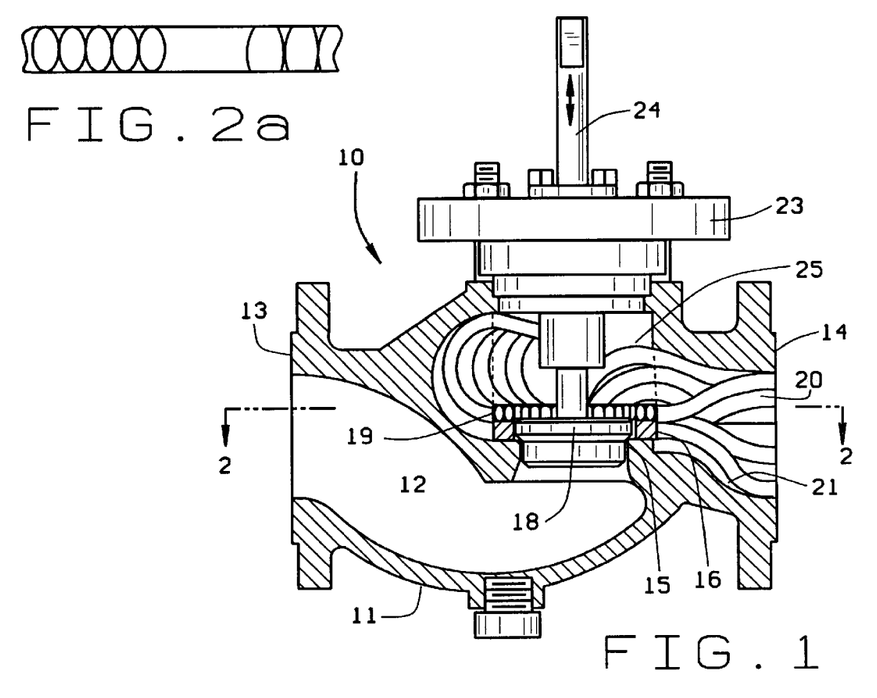

Attention is first directed to FIG. 1 of the drawings which illustrates a valve which is a single port, globe style, push stem valve having a valve element above a valve seat which closes on downward movement. The valve is generally identified by the numeral 10, and typical vendors of this type valve include the Fisher Governor Company, or an alternate source is Mason-Neilan. The valve 10 will be described first and then it will be enhanced with the addition of the tubes of the present disclosure. Finally, the valve 10 will be described in its operation without the tubes and the benefit of the tubes will also be given. Noise suppression and vibration reduction will be emphasized.

In FIG. 1 of the drawings, a valve body 11 has an inlet passage 12 which extends to a flanged, transverse face 13 which is joined in a pipeline. The diameter of the passage 12 is sized so that the flow through the pipeline is not restricted by the valve assembly. As a generalization, the valve is sized so that normal use of the valve involves only about 15% to about 60% of maximum valve capacity matching the maximum pipeline capacity. In other words, a valve is sized and specified for a particular diameter pipeline, and such a structure has a specified diameter at the passage 12. It is connected to the upstream pipeline at the end face 13 which is provided with the flange so that nuts and bolts can be used to anchor the valve in the pipeline. There is a similar and parallel face 14 on the opposite end of the valve body. This is on the downstream side. Flow is therefore from left to right as shown in FIG. 1 of the drawings. The valve body is formed with unitary construction.

As will be observed, the inlet passage 12 flows downwardly so that the fluid flow through the valve body is then directed upwardly through the valve seat as will be described. The valve body may collect liquid, and any liquid which accumulates in the passage 12 can be drained from the bottom. The passage 12 therefore terminates or ends at an upwardly directed valve seat 15. The valve seat area includes a schematically represented seat member 16 shown in sectional view. The seat typically includes an enlarged area which receives the valve seat member 16. The valve seat in that sense is a permanent portion of the valve body while the insert 16 is a sacrificial metal or hard composition material which is a sacrificial insert. Wear normally occurs the seat area. The valve is constructed so that the valve seat 15 supports the insert so that the insert is inflicted with all the wear, and the insert can thereafter be removed and replaced.

A valve element 18 works against or in cooperation with the removable and replaceable insert 16. The insert is typically fastened in position so that it cooperates with the valve element 18. In this particular illustration which is schematic in this region, it is also appropriate to add a hollow spacer ring 19 above the sacrificial insert 16. That is typically included to hold the sacrificial insert in place. The ring 19 is discussed in detail below.

Recalling that flow is from left to right, the flow impinges on the passage 12 and is turned so that it moves something in the form of an S pathway, curving downwardly and then back upwardly through the valve seat 15. The flow then turns again and moves horizontally and is directed outwardly through the passage 21. The passage 21, normally open in a valve, is filled with a set of tubes 20 to reduce noise and vibration. The tubes are included for this purpose.

Continuing on with the description of the valve, the valve body completely encircles the passages 12 and 21. Flow moves from left to right through the body and therefore moves upwardly through the valve seat region 15. The valve seat 15 is not normally used as a restriction. Rather however, the valve seat cooperates with the valve element 18 to completely block flow or to reduce flow depending on the requirements. The valve element 18 is supported on an extending stem 24. The stem is reciprocated upwardly and downwardly. Downward movement closes the valve element 18 against the sacrificial seat 16. Upward movement opens the valve element to permit flow. The stem 24 extends upwardly through a flange mounting plate 23 which secures the stem in a central or aligned position. Suitable packing along the stem (not shown) prevents leakage along the stem. In addition to that, the valve structure also includes seal rings around the stem or the assembly below the flange 23 for leak prevention.

As illustrated in FIG. 1, there is an open or empty chamber 25 which is located beneath the flange. The chamber is above the valve element 18. The chamber is kept clear of the tubes 20 which are installed. This enables the stem 24 to be moved up and to raise the valve element. Periodically, it is necessary to service the valve 10. In servicing the valve 10, it is necessary to remove the valve element 18 and dress the perimeter of the valve element to assure that the valve element maintains the proper edge profile. In addition to that, it is necessary to periodically remove and replace the insert 16 represented in schematic form in FIG. 1 of the drawings. In practice, it typically is a seal ring formed of a hard metal or composite material. In other instances, and primarily dependent on the manufacturer, the ring 16 has a relatively complex shape. In either instance, the ring 16 is made to conform with the outer edge of the valve element 18 to complete the seal. Either the ring or the seal may be cut by flowing fluid, and sometimes both have to be at least dressed or replaced depending on the measure of wear. The space 25 is open for removal and replacement of the ring 16. Perhaps this is shown better in the sectional view of FIG. 2. More specifically, in FIG. 2 a first tube is shown straight to the peripheral edge of the seal ring 16. One tube end is in this region so that the tube can collect the fluid flow and deliver the fluid flow toward the outlet of the valve.

Figure 2:
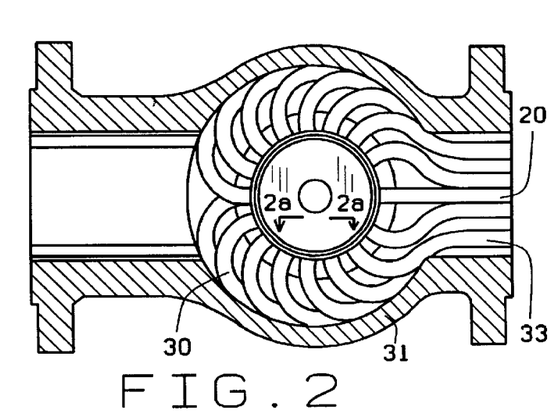
FIG. 2 is a sectional view along the line 2—2 in FIG. 1 of the drawings showing the arrangement of a number of small tubes around the periphery of valve element to pick up the flow from valving operation of the valve element and valve seat.

The several tubes partially fill the passage 21 and the space 25 above the valve element 18. More specifically, there is surplus space in this region to enable the tubes to be potted in a moldable material and locked in place by molding. One benefit of this is locking the tubes in place. Economies of cost are achieved by using thin walled tubing. The tubing is so light weight that it will vibrate, chatter and bend in high flow rates. But filling the valve body on the tube exterior holds the tubes in place to prevent chatter. In addition, the tubes are prevented from bending by the impingement of fluid flow. With the potting material around the tubes, the tube ends are anchored in place. Better than that, the tube walls define potting material passages which are formed in the potting material so that the tube wall need not be permanent or perfect.

The projection of the valve element 18 upwardly for replacement defines a dotted line at which the potting material is limited so that the potting material does not lock the valve element 18 in the valve without an escape passage. The potting material therefore is outside the dotted line in FIG. 2 to enable replacement of the valve element 18. The preferred potting material is epoxy resin with some inexpensive filler.

Figure 3:
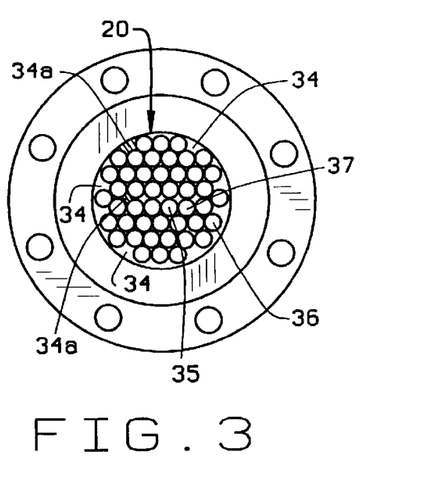
FIG. 3 is an end view of the structure shown in FIG. 2 further illustrating a nest of tubes which connects into the downstream area from the valve and which provides a smooth flow into the pipeline downstream.

Consider how FIG. 2 also illustrates many other tubes. The tubes 20 have an aggregate cross sectional flow area which is equal to 100% of the flow desired for the valve, or is even greater than 100%. The tubes are ideally made of round stock. In the assembly of the tubes in the valve, a slight degree of flattening may occur. Flattening is a practical necessity in routing the many tubes through the valves into the downstream flanged opening. The tubes are routed so that the clearance in the space 25 is maintained. In part, this requires that the tubes curve in two aspects. Consider as a first example an individual tube 30 which extends from the back side of the valve element as viewed in FIG. 2 of the drawings. Without the tube 30, the flowing fluid must make the turn which is directed by curved tube 30. Restated, gas which flows through the restricted passage 15 at the valve seat turns with great turbulence in space which is now guided by the tube 30. The tube provides smoother flow because the flow is captured in and directed by the tube. This reduces turbulence insofar as the first turn is concerned. The tube 30 has several curves. It curves (out of sight as viewed in FIG. 2) confined by the wall 31 of the housing. The tube then bends or is straightened as it directs to the right. The bend or straightening of the tube into the downstream side is similar to that for the tube 33. Likewise, all of the tubes from the back side of the valve must provide this type of continuous curving or bending so that the tubes define the nest of tubes better shown in FIGS. 2 and 3 considered jointly. In FIG. 3 of the drawings the several tubes are shown extending to the right and have parallel axes. The parallel axes collectively show the tubes conducting the gas flow in a common direction. It should be noted that this type arrangement is necessary for operation of the noise suppresser which will described in detail hereinafter.

When the valve element opens, all of the gas flow is directed into the region 25 shown in FIG. 1. FIG. 3 shows gaps such as the one pointed out by the numeral 34. Such gaps are located at many places around the nest of tubes. The several gaps are scattered in the chamber 25. The gaps 34 among the tubes are filled with epoxy resin or some suitable material. As an example, gaps 34a show the potting inserted therein.

From the foregoing, it will be observed that all of the tubes have inlet ends which are arranged near the valve seat. They are distributed around the opening so that every direction of gas flow is gathered into the several tubes. FIG. 2a shows the ends of the tubes which ends encircle the valve seat. FIG. 2a has been drawn so that the circumference of the valve seat has been illustrated in a single plane. In other words, FIG. 2a shows a planar projection, not a circle. The tube ends are abutted against adjacent tube ends so that the tubes match the throat flow area. More specifically, the tube ends can be deformed from a round shape into an oval or can even be flattened into an approximation of a square. The tube ends at the left side of FIG. 2a are oval but they are closer at the right side showing one benefit of flattening the sides so that the gap or dead space between the tube ends is reduced to the point at which all flow is smoothly directed into the tubes.

The tubes are collectively sized to receive the maximum flow rate without restricting throughput. The tubes are preferably formed of thin walled metal so that the slight deformation shown in the drawings can be easily implemented. The tubes are deformed without crimping or forming any wrinkles. One aspect of putting a sufficient number of tubes around the valve throat is to provide a total cross sectional area great enough to permit flow and another benefit is avoidance of turbulence at the tube inlets. This latter aspect is achieved by reducing the dead space between adjacent tube ends in FIG. 2a. Indeed, the tube ends are flattened almost into sharp edges to permit gas flow into the tubes with laminar flow.

The tubes are illustrated in FIG. 1 of the drawings as terminating at the flange face. In the actual construction of the device, it is not necessary to terminate all of the tubes in a common plane. Some of the tubes can be longer than others and extend further to the right. As an example, the tubes in the center of the nest of tubes might be longer or shorter than the tubes at the outer region. Going to FIG. 3 of the drawings, the tube 35 optionally has a length different from the tube 36. The tube 37 is intermediate of the tubes 35 and 36 in length. For ease of assembly so that the valve 10 can be installed in a pipeline and removed easily, the tubes 35, 36 and 37 might have different lengths but not extend excessively to the right of the flange as illustrated in FIG. 1 of the drawings. For instance, the tube 35 might be longer than tube 36, and the tube 37 can be intermediate of the two tubes.

Downstream, the discharge of the multitude of tubes into the pipeline preferably delivers gas which flows quickly into a laminar pattern with a marked reduction in gas turbulence. The gas flow is directed to the right, delivered through the various tubes, flowing in parallel lines, and is delivered across the entire diameter of the pipeline so that the flow is significantly and substantially laminar. This type of laminar flow enables the system to reduce the turbulence created by placing the valve 10 in the pipeline. Consider as an example the contrast of the flow patterns in the pipe with and without the valve 10. With no valve 10, the flow will be substantially laminar along the full length of the pipeline. With the valve 10 installed, a large amount of turbulence is created and observed downstream for a long distance. Vibrations from the region of the valve are created and are transferred into the valve, the pipe, and the support holding the valve and pipe. Noise can be heard at great distances. By placing the tubes 20 in the downstream side of the valve, and arranging the tubes adjacent to the valve element, there is a significant and substantial reduction in noise. As described, the inlet ends of the tubes are located around the periphery of the valve element. The tubes extend to the right and one embodiment terminates the tubes at different lengths extending downstream in the pipe. They are constructed in this fashion to suppress the turbulence and reduce the noise which will be experienced downstream. All of the flowing gas is collectively gathered and sent downstream so that the gas flow is much quieter, and turbulence is significantly reduced. One benefit of this is that power or energy dissipation in the region of the valve is suppressed.

The valve 10 is a typical valve construction. One source of this valve is the Fisher Governor Company. This type of valve is manufactured so the stem is pulled out to open the valve. This arrangement will likewise work in the same type valve where the stem is pushed in to open the valve. In both instances, the turbulence downstream from the valve seat is significantly reduced.

STATIONARY VALVE CONSTRUCTION

Figure 4:
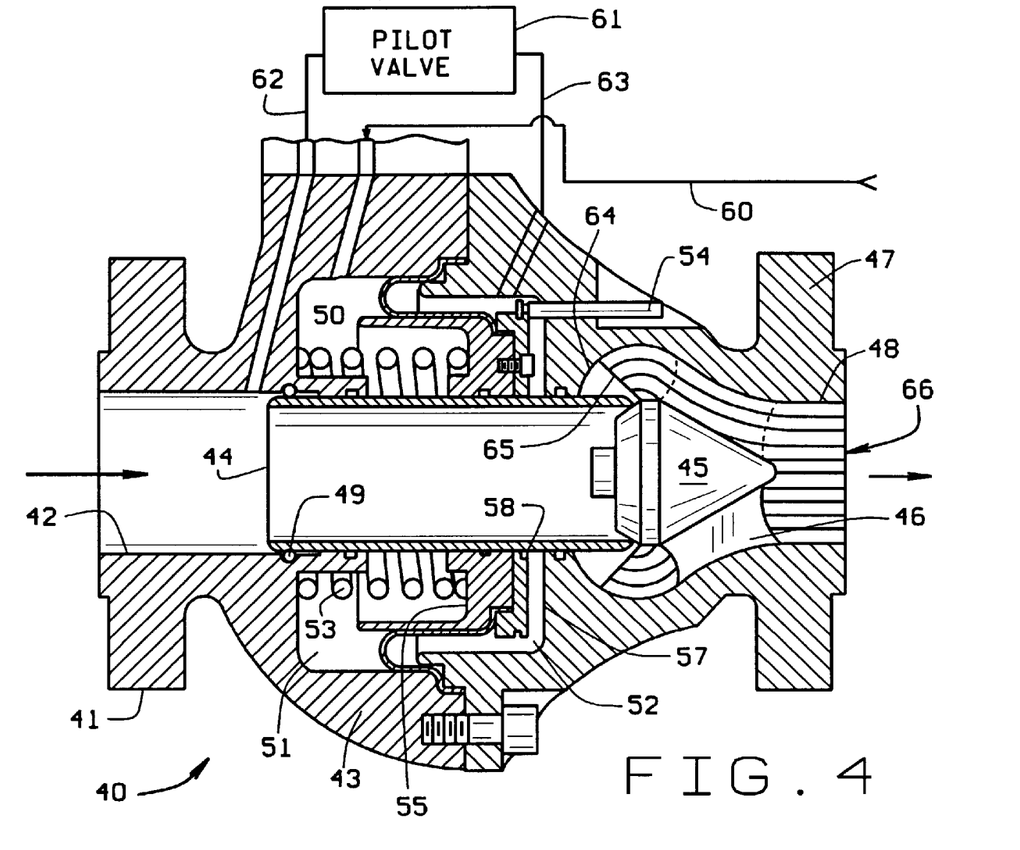
FIG. 4 is a side view in section showing a restrictor plug cooperative with an adjustable sleeve which creates noise and wherein the present disclosure sets forth a set of tubes connected downstream of the plug to assure smoothed flow with noise reduction.
Figure 5:
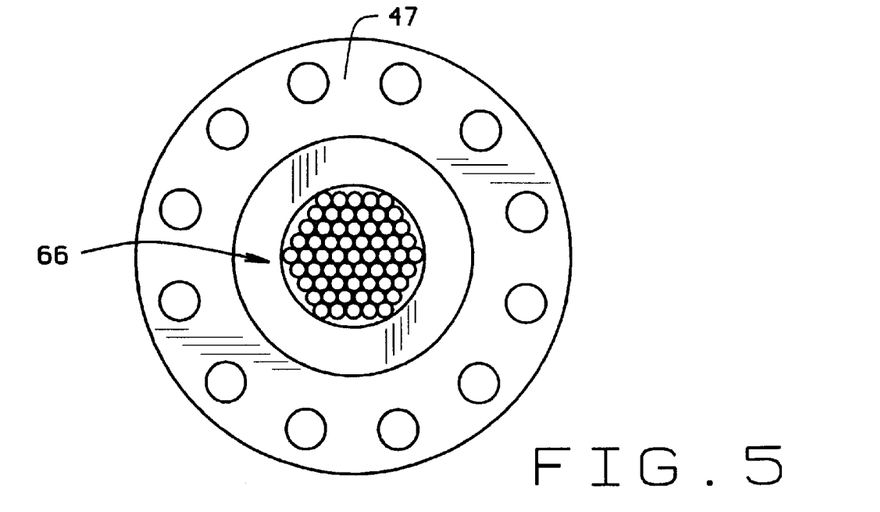
FIG. 5 is an end view of the flow restrictor shown in FIG. 4 of the drawings.

Attention is now directed to FIG. 4 of the drawings where the numeral 40 identifies a throttling valve utilizing a stationary valve plug and a movable sleeve. Such a valve is detailed in U.S. Pat. No. 3,456,674. The valve 40 is shown in the closed position. To provide a description of the valve, flow through the valve is from left to right. Proceeding from the inlet side, a flange 41 constructed in accordance with industry standards. There is an inlet opening 42. This directs flow into the central portions of the valves. This valve is housed with a valve body 43. The valve body encloses a movable sleeve 44. The sleeve travels to the left for opening and moves to the right for closure. It is contacted against the stationary valve plug 45. This is supported on two or three vanes 46. The vanes 46 extend radially inwardly from the housing which surrounds the plug 45. There is an outlet 48 which is surrounded by a flange 47. The flange is similar to the flange 41 both being constructed with an industry standard. The sleeve 44 is constructed with an outer surface which is contacted by a set of seals. The seal 49 prevents leakage along the exterior of the sleeve. The sleeve is moved to the right or left by a diaphragm 50. The diaphragm is in a chamber which is divided into two portions, there being a first reduced pressure chamber 51 on the left of the diaphragm and a high pressure chamber 52 on the right side of the diaphragm. The chambers 51 and 52 create a pressure differential which moves the diaphragm to the left or right. Movement to the left is opposed by a bias spring 53. The spring 53 is incorporated to return the sleeve to the closed position in the absence of pressure differential.

Briefly, this device operates on a combination of forces, one force being the bias force from the spring 53. The spring 53 closes the sleeve 44 against the valve element 45. When a pressure differential is created, the chamber 52 is raised to a pressure above the chamber 51. When that occurs, the increase in pressure differential causes the sleeve to move to the left. Movement to the left is signal fed to the observer on an exterior by movement of an indicator rod 54. The rod tip is exposed for external viewing. As will be understood, the housing is constructed of two components which are bolted together. They clamp the outer periphery of the diaphragm 50 to hold it snugly in place. The inner edge of the diaphragm 50 is clamped in a two part system which is constructed in the fashion of a thimble. The thimble has a spring seat 55 on the interior of the thimble 56. The thimble is also constructed with a back plate 57. The back plate 57 clamps with the thimble 56 so that the diaphragm is sealed at its inner periphery. The back plate 57 is joined to the sleeve 44 by a snap ring 58. Appropriate seals are located along the sleeve 44 on the exterior to prevent leakage between the chambers 51 and 52. The chamber 51 is provided with downstream pressure through a line 60. A pilot valve 61 is used for control and is provided with the upstream pressure through a line 62. It forms a reduced control pressure which is input on the line 63 to the chamber 52 on the backside of the diaphragm.

Consider an example of operation to explain movement of the sleeve 44. When there is no gas in the line, the bias spring 53 closes the sleeve 44 against the valve element 45. When there is upstream pressure, it is delivered through the line 62 to the pilot valve 61. That valve then provides a controllable, reduced pressure on the line 63 which is applied to the backside of the diaphragm. Consider for example that upstream pressure is 1000 psi. Assume for purposes of description that the pressure in the line 63 is 950 psi. The pressure on the back face of the diaphragm 50 is then 950 psi. If the downstream pressure is quite low, the pressure on the upstream chamber 51 is less than the pressure in the chamber 52. This causes the diaphragm to move the sleeve. Assume that the downstream pressure is only 500 psi. With 500 psi applied to the chamber 51, the sleeve 44 is moved to the fully opened position. As downstream pressure builds, the differential across the diaphragm 50 changes. While it approaches a minimal differential, the spring 53 creates the bias force that moves the sleeve to the right toward closure.

When the sleeve moves to the open position, fluid flows to the right. The housing has an enlarged chamber 64 which receives the flow around the plug 45. The chamber 64 tapers to a smaller passage 48 as previously identified. Flow through this chamber is ordinarily turbulent downstream of the opening of the sleeve 44, depending upon the amount of flow and the shape of the plug 45. It is possible to make the plug 45 with a streamline front end and still obtain a measure of substantial turbulence. It is likewise possible to enhance the flow pattern by extending the length of the plug. Even if the plug 45 is made with a very smooth aerodynamic shape, there will be substantial turbulence. The present invention contemplates the incorporation of a set of tubes which extend through the chamber 64. The inlet end 65 of a tube is located in the chamber 64 so that the tube will pick up the flow and direct it through the tube. This reduces turbulence of that increment of the flow. Accordingly, there are multiple tubes incorporated in the system which are located around the plug 45. The nest of tubes is generally indicated by the numeral 66. The tubes again are shown having different lengths upstream. In like fashion, they can have the same or different lengths downstream. The tubes collectively have outlets which direct the flow parallel to the axis of the downstream pipe. This flow is with reduced turbulence as a benefit of the tubes incorporated in the valve 40.

As the sleeve 44 is operated to different positions, the sleeve meters the flow of gas through the regulator. The downstream flow is distributed by the incorporation of the plug 45. The number of tubes is variable and it will also be appreciated that they are best positioned at all points around the periphery of the plug 45. In one aspect, the tubes are generally round along their length. If however they are slightly flattened or deformed from perfect circular construction, that is generally permissible provided the distortion from a circular shape extends smoothly along the respective tubes 66 and no crimps or wrinkles are formed.

DIAPHRAGM REGULATOR

Figure 6:
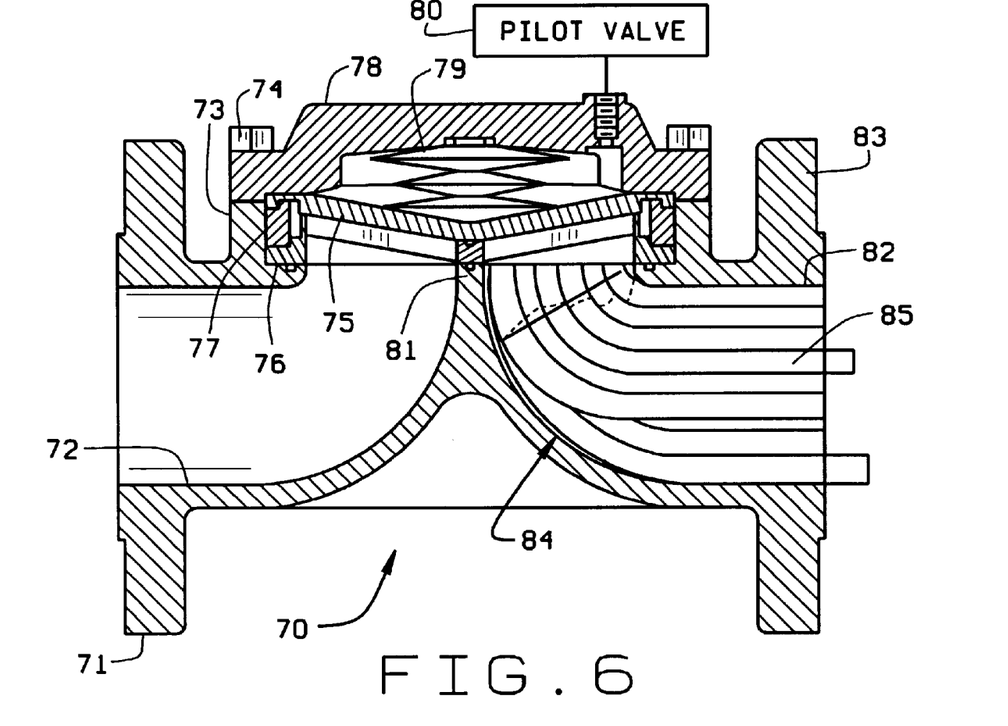
FIG. 6 is a sectional view through a flow regulator comprising a diaphragm which deflects and seals against a transverse dam.
Figure 7:
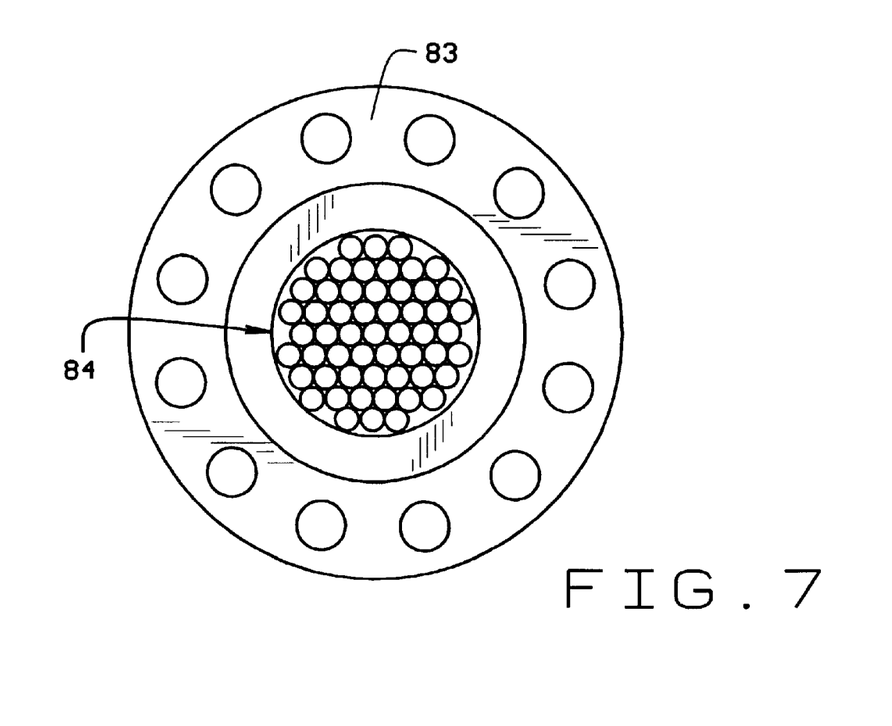
FIG. 7 is an end view showing the noise suppressing tubes in the embodiment shown in FIG. 6 of the drawings.

Going now to FIG. 6 of the drawings, the numeral 70 identifies a diaphragm regulator. This regulator is exemplified by the products of Mooney Controls Company of Salt Lake City, Utah. This type of diaphragm regulator creates significant turbulence in operation. To consider how the device operates, FIG. 6 of the drawings shows an upstream flange 71 which is suitably connected in the fluid flow of a pipeline. There is an inlet passage 72 which bends at an angle, ultimately directing the flow laterally after bending the flow through about 90°. The body of the diaphragm regulator is constructed as a unitary member with the inlet passage 72. At the side of the body, there is a circular opening which is defined at a laterally protruding flange 73. Through the use of suitable bolts 74, a flange cover is placed over the opening and is constructed so that it captures a resilient diaphragm 75. The diaphragm 75 has an outer peripheral lip. The lip is held in place by a mounting ring 76 operating in conjunction with an adjacent ring 77. The two rings clamp the outer periphery of the diaphragm.

The diaphragm is held on the back face by the circular, flange mounted cover 78. The cover 78 is likewise constructed with an internal seat to receive a washer stack 79 which operates as a spring, and preferably is the Belleville Spring. This representative spring system bears against the diaphragm and provides a bias force to close the diaphragm.

The lid 78 is constructed with an opening to enable connection to a pilot valve 80 which is operated as a control. It provides pressure on the back face of the diaphragm to control opening of the diaphragm.

The diaphragm 75 has twice the width compared with the opening 72. The opening 72 is a circular opening which remains circular beneath the diaphragm. This defines a small dam 81 which extends at right angles to the direction of fluid flow. The dam 81 seats against the lower face of the diaphragm. Moreover, the dam 81 is constructed with a seal which bears against the lower face of the diaphragm 75 to seal when contact is made. In addition to that, the seal provides isolation between the inlet and outlet of the regulator 70 observing the inlet end 72 and the downstream side which will be described in the next paragraph.

FIG. 6 shows an outlet 82 which is equal in diameter to the inlet 72. It is located at a flange 83 for connection with the downstream tubing.

The numeral 84 generally identifies the set of tubes positioned in the outlet side of the regulator 70. It might be further noted that the tubes shown in FIG. 6 can have a common beginning and end or alternately they can have different lengths. Consider as an example the tube 85 which is part of the nest of tubes. It has been shown to end slightly to the right of the other tubes. In like fashion, at the left hand end, it can be shorter by terminating at the dotted line shown in FIG. 6. It is sometimes helpful to introduce the turbulent flow into the nest of tubes as close as possible to the diaphragm. The dotted line termination point shown in FIG. 6 sets forth different lengths. This is sometimes advantageous, thereby providing a shorter tube and still capturing the flow so that turbulence is reduced at the inlet side of the tubes. At the outlet side, if the tube 85 is slighter longer, the incremental flow through the tube 85 merges with the flow from the other tubes over a region downstream of the several tubes, thereby enabling blending of the several flows into a single flow which is substantially without turbulence. The flow is essential laminar downstream. For that reason, several tubes are illustrated as having different end locations and different outlet discharge points so the several tubes make up an assembled system delivering laminar flow gas downstream of the regulator 70.

FLOW REGULATOR

Figure 8:
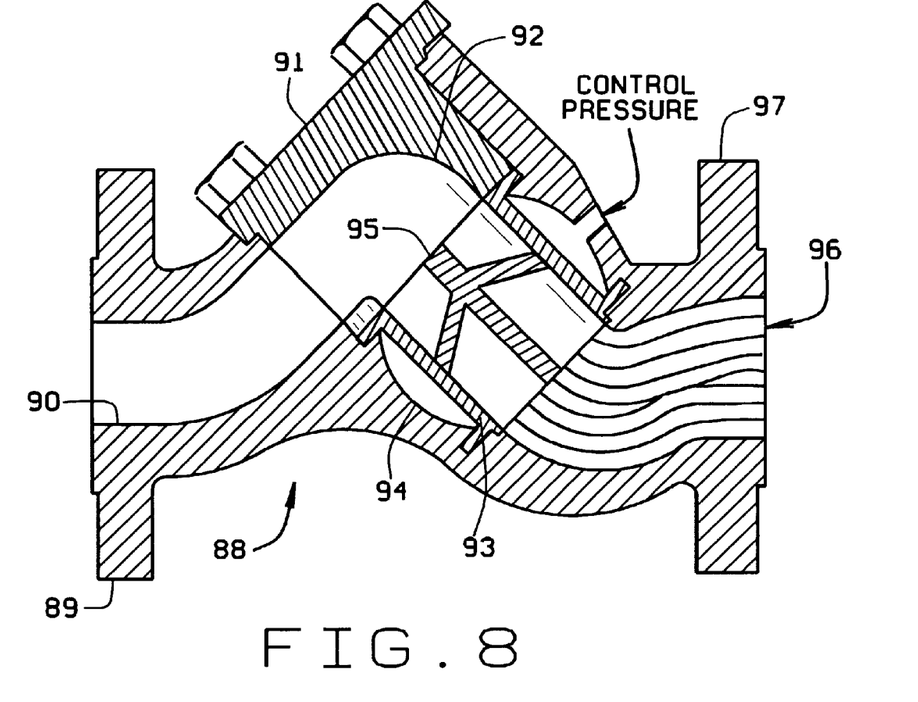
FIG. 8 is a sectional view through another embodiment of a flow restrictor.
Figure 9:
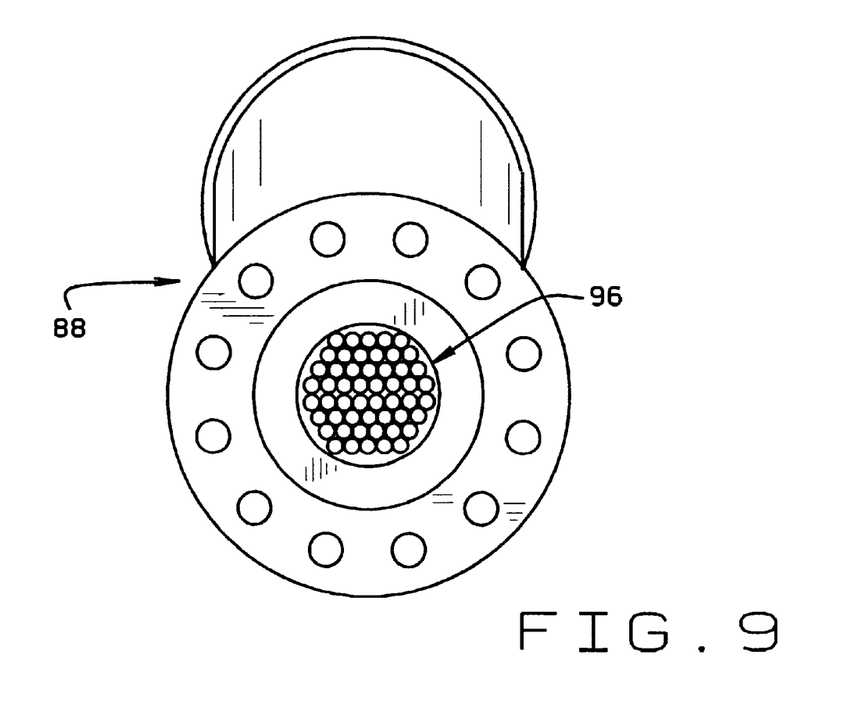
FIG. 9 is an end view of the flow restrictor shown in FIG. 8 again illustrating a set of tubes which suppress noise and vibration.

In FIGS. 8 and 9 of the drawings, a flow regulator 88 is illustrated. It is constructed for installation in a pipeline. Flow is directed through an elbow which defines a 90° bend. This device is especially easy to service so that components can be replaced readily. More specifically, the regulator shown in FIG. 8 of the drawings incorporates a flange 89 surrounding an inlet port 90 which is the left hand end of a passage of circular cross sectional shape. It extends in a housing which defines an elbow or turn in the flow. The housing is constructed with a port which is closed by a cover 91 which is fastened in place by a set of bolts. This positions an elbow 92 for directing flow through the turn. Servicing for this construction will be explained. Continuing however with the description, flow is controlled by a regulator sleeve 93 which is located on the interior of an external chamber 94. The chamber 94 is provided with fluid on the back side of the sleeve 93. This enables the sleeve to be pressure controlled i.e., it shrinks or expands depending on requirements. The sleeve 93 is shrunk or expanded by the introduction of fluid under pressure on the back face of the sleeve. The sleeve extends radially inwardly to provide choking for controlling flow. Moreover, the sleeve is captured at both ends so movement is constrained and occurs primarily at the central part of the sleeve. The sleeve is able to expand by a controlled amount so that flow regulation occurs. When the sleeve expands radially inwardly, it controls the flow in cooperation with a central core 95 coaxially in the sleeve thereby defining an annular flow space.

Servicing of this device is accomplished easily. The cover 91 is removed by unthreading the bolts which hold it in place. This enables the core 95 to be removed, and then the sleeve 93. When the sleeve and core have been removed, it is possible to then position a set of tubes 96 in the downstream side of the regulator 88. The tubes 96 preferably terminate as close as possible to the sleeve. Gas flow is adjacent to the sleeve and moves through the annular space on the interior of the sleeve. It emerges in the form of a ring and tends to expand radially inwardly into the downstream passages. That creates turbulence which is overcome by the tubes 96 which are positioned downstream from the sleeve. As before, the tubes are shown terminating as far to the left as possible so they are close to the point of introduction of turbulent gas flow. The tubes extend to the right and preferably terminate approximately even with the downstream flange 97. The tubes can terminate evenly; the tubes then deliver the downstream flow so that laminar flow is quickly possible with the suppression of noise. As before, if some of the tubes have different lengths, that is generally helpful in the operation of the device because it tends to merge the individual tube streams in a fashion reducing turbulence.

The flow regulator of FIGS. 8 and 9 again is installed in a pipeline utilizing flange mountings as noted. It is preferable that the diameter of the passages of the regulator match the pipe id. This enables flow to continue downstream to the pipeline without undue restriction of the flow.

Figure 10:
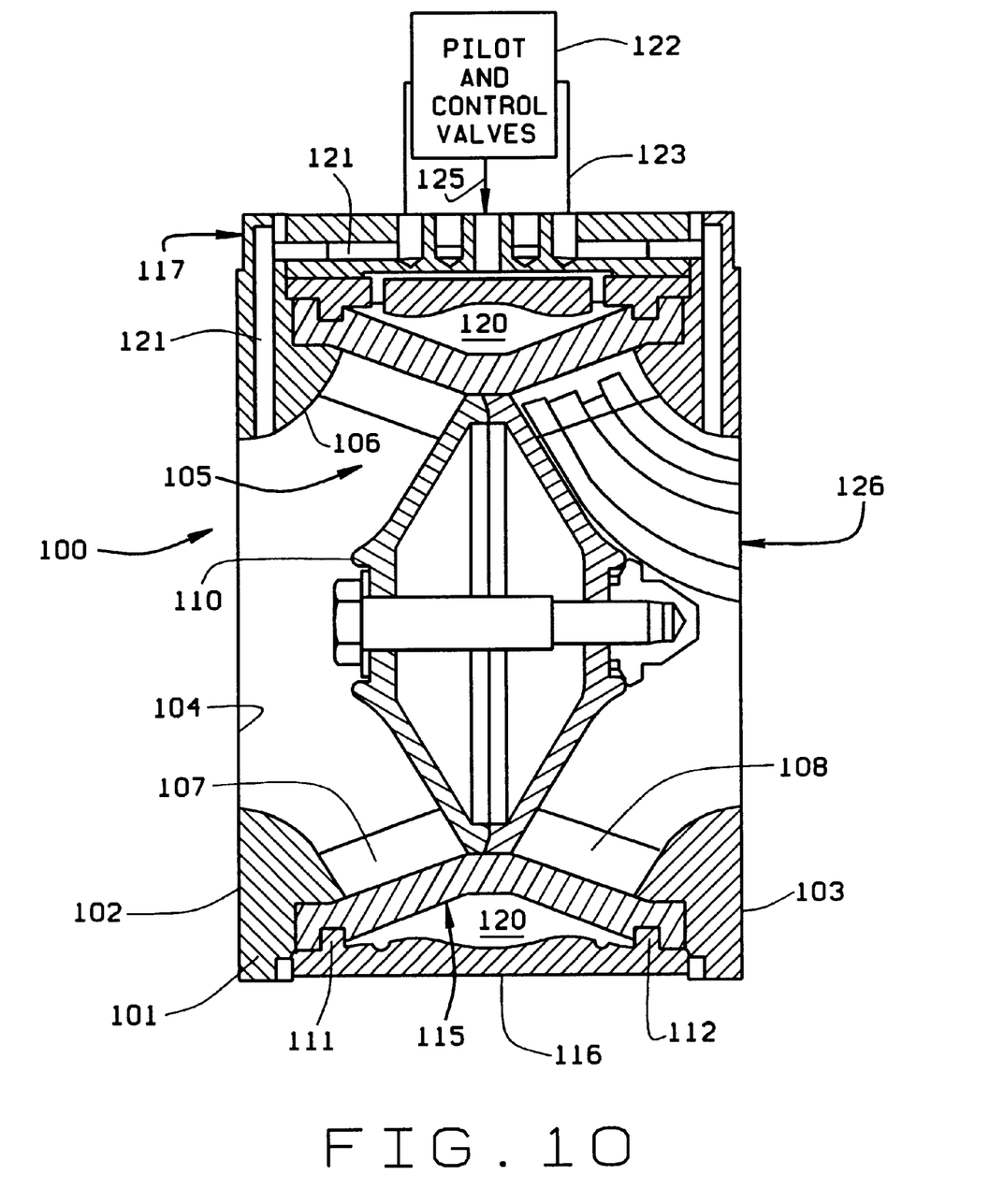
FIG. 10 is a sectional view of a sleeve type regulator.

FIG. 10 of the drawings shows in sectional view a sleeve type regulator 100 featuring an elongate body 101 ending at a pair of spaced end faces 102 and 103. There is an inlet end opening 104 directing flow radially outwardly toward an encircling chamber 105 defined by the expanding chamber wall 106. The wall 106 is interrupted by a set of upstream vanes 107 similar in shape to a set of similar downstream vanes 108. There are two to four vanes in each of the two sets of vanes. The two sets of vanes support an axially symmetrical center plug 110. On the upstream and downstream sides of the plug, the curvatures enable gas flow to be directed radially outwardly and inwardly with the smoothest possible flow pattern.

SLEEVE TYPE FLOW REGULATOR

FIG. 10 further includes a pair of spaced clamp lips 111 and 112. The lips are directed inwardly to fit into spaced groves in a flexible sleeve 115. The lips 111 and 112 are formed on the interior of a metal housing 116 which housing is circular in cross-sectional view equipped with an attached lengthwise manifold 117. The manifold 117 has several passages enabling the control system to connect to modulate fluid flow. The vanes 107 and 108 support the flexible sleeve 115 on the interior while the ends of the sleeve are locked on the lips to define a pressure isolated chamber outside the sleeve 115. The two ends of the sleeve 115 are clamped to define an external chamber 120 for control of the sleeve 115.

The sleeve is encircled by the chamber 120 so that control of the sleeve is achieved to modulate gas flow. The manifold 117 has an upstream passage 121 to supply pressure to pilot and control valves 122. Downstream pressure is input via a passage 123 and control pressure is delivered through a passage 125 to the chamber 120. Control pressure, if increased, closes the sleeve 115 to stop flow, and, if decreased, enables controlled fluid flow to move around the center plug 110. On flowing in the gap around the plug on the inside of the distended sleeve, turbulence is created. The turbulence is quieted by placing a set of tubes 126 on the interior of the regulator 100 so that the tubes pick up the flow and smoothly direct flow downstream and suppress the turbulence. The tubes 126 extend near the inside wall of the sleeve and enable pick up of the gas flow to avoid turbulence. As before, the tubes end downstream and deliver laminar flow for easy transmission.

The present invention contemplates placement of a set of tubes downstream of a noisy valve element spaced from the valve seat, i.e., a partly open valve opened in some designated opening range. Likewise, the flow regulator is a noise source just a shown in FIG. 4, and again it is commonly used in a situation where it is open in a designated throttling range. In this sense, both the valve and regulator have designed ranges which are the commonly used operating ranges. By contrast, the valves and flow regulators are not normally operated at fully closed or opened positions but they are operated at some mid range use. The downstream noise reduction is especially effective in these preferred operating ranges. In addition, the tubes improve pressure recovery so that the invention provides benefits of a high recovery type valve.

While the foregoing is directed to the several embodiments, the scope is determined by the claims which follow.

I claim:

1. A turbulence suppression system in a gas flow line comprising:

a housing containing a turbulence creating member, said housing adapted to be located along the gas flow line;

a plurality of tubes disposed within said housing and having inlet and outlet ends, wherein said inlet ends are located immediately downstream of said turbulence creating member;

wherein said inlet ends collectively have sufficient cross-sectional area to, and are positioned to, intercept all of the gas flow past said turbulence creating member;

wherein said plurality of tubes are configured to converge with each other; and wherein said plurality of tubes are all parallel to one another and to the gas flow line proximate to said outlet ends.

2. The turbulence suppression system of claim 1, further comprising potting disposed between said plurality of tubes.

3. The turbulence suppression system of claim 2, wherein said potting consists of epoxy resin.

4. The turbulence suppression system of claim 1, wherein said plurality of tubes are flared at an angle proximate to said inlet openings, and said plurality of tubes extend at least partially beyond said housing proximate to said outlet openings.

5. The turbulence suppression system of claim 1, wherein said housing contains a valve.

6. The turbulence suppression system of claim 1, wherein said housing contains a flow regulator.

7. The turbulence suppression system of claim 1, wherein said housing contains a flow restrictor.

8. The turbulence suppression system of claim 1, wherein said turbulence creating member comprises a vane-supported central plug directing gas flow around said plug in an annular flow pattern.

9. The turbulence suppression system of claim 8, wherein said plug is centered within an elongated sleeve moving radially inward to control flow.

10. The turbulence suppression system of claim 1, wherein said turbulence creating member is supported in a gas flow line between a pair of spaced ends of an elongated tubular member and said spaced ends are adapted for joining the gas flow line, and the gas flow line extends beyond said elongated tubular member and said plurality of tubes end within said spaced ends.

11. The turbulence suppression system of claim 10, wherein said plurality of tubes are wholly contained within said elongated tubular member.

* * * * *